United States Patent
Hölzl et al.

(10) Patent No.: US 12,455,022 B2
(45) Date of Patent: Oct. 28, 2025

(54) CONNECTION ELEMENT

(71) Applicant: Linde GmbH, Pullach (DE)

(72) Inventors: Reinhold Hölzl, Pullach (DE); Matthias Grundwürmer, Pullach (DE); Thomas Englert, Pullach (DE); Josef-Andreas Pöllmann, Pullach (DE)

(73) Assignee: Linde GmbH, Pullach (DE)

( * ) Notice: Subject to any disclaimer, the term of this patent is extended or adjusted under 35 U.S.C. 154(b) by 216 days.

(21) Appl. No.: 18/259,206

(22) PCT Filed: Dec. 6, 2021

(86) PCT No.: PCT/EP2021/025483
§ 371 (c)(1),
(2) Date: Jun. 23, 2023

(87) PCT Pub. No.: WO2022/144091
PCT Pub. Date: Jul. 7, 2022

(65) Prior Publication Data
US 2024/0052956 A1    Feb. 15, 2024

(30) Foreign Application Priority Data
Dec. 30, 2020 (EP) .................... 20020655

(51) Int. Cl.
*F28D 7/10* (2006.01)
*B22F 10/28* (2021.01)
(Continued)

(52) U.S. Cl.
CPC ............ *F16L 13/007* (2013.01); *B22F 10/28* (2021.01); *B23K 35/004* (2013.01); *B33Y 80/00* (2014.12); *C22C 38/12* (2013.01); *C22C 38/22* (2013.01); *C22C 38/44* (2013.01); *C22C 38/48* (2013.01); *C22C 38/52* (2013.01); *F28D 7/106* (2013.01); *F28F 21/083* (2013.01);
(Continued)

(58) Field of Classification Search
CPC ........ F16L 13/007; B33Y 80/00; B22F 10/28; C22C 8/12; C22C 8/22; C22C 8/48; C22C 8/52; F28D 7/106; F28D 21/083
USPC ...................................................... 165/154
See application file for complete search history.

(56) References Cited

U.S. PATENT DOCUMENTS

2019/0134755 A1    5/2019    Mann

FOREIGN PATENT DOCUMENTS

CN        1210044 A   *  3/1999
DE      19702719 C1   *  4/1998
(Continued)

Primary Examiner — Davis D Hwu
(74) Attorney, Agent, or Firm — Millen, White, Zelano & Branigan, P.C; Brion P. Heaney

(57) ABSTRACT

Provided is a connection element comprising a tubular first part with a first ring-shaped connection face for connection with a highly heat resistant steel pipe and a tubular second part with a second ring-shaped connection face for connection with a first ferritic steel pipe; wherein the first part is of a corrosion resistant steel material and wherein the second part is of a ferritic steel material; wherein the first and second parts are in one-piece and formed such that a passage between the first and second ring-shaped connection faces is formed; and wherein the first and second parts are produced by an additive manufacturing process. Further provided are a pipe arrangement and a heat exchanger.

20 Claims, 3 Drawing Sheets

(51) Int. Cl.
*B23K 35/00* (2006.01)
*B33Y 80/00* (2015.01)
*C22C 38/12* (2006.01)
*C22C 38/22* (2006.01)
*C22C 38/44* (2006.01)
*C22C 38/48* (2006.01)
*C22C 38/52* (2006.01)
*F16L 13/007* (2006.01)
*F28F 21/08* (2006.01)
*B23K 101/14* (2006.01)
*B23K 103/04* (2006.01)

(52) U.S. Cl.
CPC ....... *B22F 2301/35* (2013.01); *B23K 2101/14* (2018.08); *B23K 2103/04* (2018.08)

(56) References Cited

FOREIGN PATENT DOCUMENTS

KR    20200010628 A    1/2020
WO    2008/030669 A1   3/2008

* cited by examiner

CONNECTION ELEMENT

The present invention concerns a connection element for connecting steel pipes, specifically for connecting highly heat resistant steel pipes, such as an austenitic steel pipe, with ferritic steel pipes.

PRIOR ART

In the petrochemical industry steam cracking is used to break down saturated hydrocarbons, such as naphtha, liquefied petroleum gas, ethane, propane or butane into lighter hydrocarbons, such as lighter alkenes, including ethene and propene. During this process the process fluid is typically passed through furnace coils and pipes of a steam cracking furnace and is heated to temperatures above 500° C., often above 700° C. or 800° C., in order to initiate the desired chemical reaction. Due to these high temperatures the furnace coils are made of a highly heat resisting material, particularly of an austenitic steel.

After the chemical reaction, the cracked gas that leaves the steam cracking furnace can have a temperature of more than 700° C. and needs to be cooled down (quenched) at a high rate. To that end so-called 'linear quench exchangers' are utilised, which are designed as double pipe heat exchangers. A cooling fluid, typically water, is flowing in the space between the inner and outer pipes and the cracked gas is guided through the inner pipe, i.e. the inner pipe is connected to an outlet pipe of the furnace. As material for the double pipe ferritic steel materials are used, leading to a connection between two different steel materials. The connection can be achieved by welding edges at ends of the pipes, e.g. with a V-joint extending in circumferential direction.

In the connection zone different temperatures (due to the cooling with the cooling fluid) and different coefficients of thermal expansion (due to the different materials) lead to increased stress, which in turn can lead to formation of cracks in the weld. Additionally, from the side of the cracking furnace, coking can induce stress into the connection zone. On the side of the double pipe, coarse graining of the ferritic steel can occur, as the temperature in the connection zone cannot always be precisely controlled. These effects can lead to increased wear and breakdown of the connecting weld between the austenitic and ferritic pipes, which finally may require a time-intensive and costly repair during which steam cracking operation has to be stopped. Therefore, an objective of the present invention is to provide a connection between austenitic and ferritic steel pipes that is reliable under high temperature conditions, and more specifically that is reliable in transition zones in which a temperature drop from high temperature to lower temperature takes place.

DISCLOSURE OF THE INVENTION

Provided are a connection element, a pipe arrangement, a heat exchanger and a processing arrangement according to the independent claims. Dependent claims relate to preferred embodiments.

The connection element comprises a tubular first part with a first ring-shaped connection face for connection with a highly heat resistant steel pipe (in particular with an austenitic steel pipe) and a tubular second part with a second ring-shaped connection face for connection with a first ferritic steel pipe; wherein the first part is of a corrosion resistant steel material (in particular of an austenitic steel) and wherein the second part is of a ferritic steel material; wherein the first and second parts are in one-piece and formed such that a passage between the first and second ring-shaped connection faces is formed (i.e. a passage for fluid is formed from the interior of the first ring-shaped connection face to the interior of the second ring-shaped connection face); and wherein the connection element is produced by an additive manufacturing process.

By using additive manufacturing (which can be seen as a 3D-printing process) for producing the connection element, the first and second parts, which are of different materials, are produced in one-piece, such that a durable connection between pipes can be achieved, which is reliable under high temperature conditions and high stress conditions.

During additive manufacturing material to be added is applied directly to a workpiece. The raw materials can be provided in powder form or as wires. Typically, in the additive manufacturing process the raw material is provided through a supply nozzle and molten through a focussed heat source, such as a laser, an electric arc, or an electron beam. The molten material is then added to the workpiece. Normally, the supply nozzle and the heat source are mounted on a gantry system or robot arm that is movable, such that the material can be added to the workpiece at selected positions in three-dimensional space. Particularly, workpieces having a complicated geometry can be produced by additive manufacturing that otherwise (e.g. by casting) could not be produced.

Preferred additive manufacturing processes are a cladding process, direct energy deposition (DED), wire arc additive manufacturing (WAAM), electron beam additive manufacturing, laser beam additive manufacturing or plasma arc additive manufacturing.

The term 'ring-shaped connection face' refers to a connection face that has the form of an annulus (i.e. a region that is bounded by two concentric circles), which may be inclined with respect to the axis of symmetry, i.e. be a conical formed region. The term should also include connection faces that deviate from the circular form, e.g. a (possibly inclined) region that is bounded by two concentric ovals or ellipses, depending on the shape of the pipes that are to be connected. However, normally, a circular form is preferred. 'Interior' refers to the region surrounded by the ring-shaped connection face.

The expressions 'ferritic steel pipe', 'austenitic steel pipe', 'corrosion resistant steel pipe', 'highly heat resistant steel pipe' refer to pipes made of the respective steel material (e.g. a 'ferritic steel pipe' is a pipe whose material is a ferritic steel).

The material of the first part is preferably an austenitic steel, more preferably selected from NiCr23Co12Mo (Alloy 617, 2.4663), NiCr22Mo9Nb (Alloy 625, 2.4856). The material of the second part is preferably selected from 16Mo3 (1.5415), 13CrMo4-5 (1.7335), 10CrMo9-10 (1.7380). In each case norm designations are used.

Preferably the first part has a third ring-shaped connection face for connection with a second ferritic steel pipe; wherein the third ring-shaped connection face is arranged concentrically with the second ring-shaped connection face, as seen in a length direction. The second and third ring-shaped connection faces can advantageously be connected with a double pipe (first and second ferritic steel pipes) of a double pipe heat exchanger, allowing a fluid to be cooled to be introduced from the highly heat resistant (stainless) steel pipe into the inner (first) ferritic steel pipe.

In the first part preferably a cooling channel extending along a circumference is formed; wherein more preferably, if applicable, an outlet of the cooling channel is arranged between the second ring-shaped connection face and the third ring-shaped connection face (as seen in longitudinal direction). The cooling channel allows cooling of the connection element by supplying the cooling channel with a cooling fluid, such as water. For example, a temperature of the connection part can be controlled, such that its temperature does not exceed a temperature of approximately 300° C.-400° C. By cooling the connection element diffusion of carbon into the corrosion resistant material of the first part can be suppressed.

The cooling channel is preferably spiral-shaped. This arrangement is especially advantageous if the outlet of the cooling channel is positioned between the second and third ring-shaped connection faces, as then a spiraling flow of cooling fluid will be introduced between double pipes.

Preferably, the first part comprises a inner sleeve and/or a outer sleeve arranged in radially overlapping relation on the inside or the outside of a section of the second part; wherein more preferably, if applicable, the inner and/or outer sleeves are arranged at least partially in radially overlapping relation with the cooling channel. The inner and outer sleeves, which are of a corrosion resistant material as the first part, provide a protection from corrosion for adjacent sections of the second part. The term 'sleeve' refers to a cylinder barrel shaped section.

Further, preferably, the first part comprises a thermo-sleeve that extends inside the first part; wherein the thermo-sleeve is spaced apart from the second part and/or, if a inner sleeve is present, the inner sleeve; and wherein preferably, if applicable, the thermo-sleeve is radially overlapping the cooling channel. The thermo-sleeve provides further protection of the connection part from negative thermal influence, i.e. from getting to hot. More specifically, the sections of the connection part, where the first and second parts interface, are shielded from heat.

The connection element preferably has a transition region between the first and second parts, in which a gradual transition between the compositions of the materials of the first and second parts takes place. A transition region between the two parts, and therefore between the two materials, provides a reliable connection under thermal/mechanical stress. Such a transition region can easily be formed in an additive manufacturing process, e.g. by mixing the raw materials prior to melting, if they are provided as powder.

A pipe arrangement according to the invention comprises a highly heat resistant (in particular austenitic) steel pipe, a inner ferritic steel pipe and a connection element according to the invention, wherein an end of the highly heat resistant steel (in particular austenitic) pipe is connected to the first ring-shaped connection face of the connection element by a circumferential weld joint, and wherein an end of the inner ferritic steel pipe is connected to the second ring-shaped connection face of the connection element by a circumferential weld joint; wherein preferably the highly heat resistant steel pipe is an austenitic steel pipe.

Further, the pipe arrangement preferably comprises an outer ferritic steel pipe that forms a double pipe together with the inner ferritic steel pipe; wherein the connection element is a connection element having a third ring-shaped connection face; and wherein an end of the inner ferritic steel pipe is connected to the third ring-shaped connection face of the connection element by a circumferential weld joint.

A heat exchanger according to the invention comprises an inner ferritic pipe for a fluid to be cooled and a connection element according to the invention; wherein an end of the ferritic inner pipe is connected, preferably by a circumferential weld joint, to the second ring-shaped connection face of the connection element.

The heat exchanger preferably is a double pipe heat exchanger having a double pipe formed by the inner ferritic pipe and an outer ferritic pipe; wherein the connection element is a connection element having a third ring-shaped connection face; and wherein an end of the outer ferritic pipe is connected, more preferably by a circumferential weld joint, to the third ring-shaped connection face of the connection element.

Further, the heat exchanger preferably comprises a highly heat resistant steel pipe; wherein an end of the highly heat resistant steel pipe is connected, more preferably by a circumferential weld joint, to the first ring-shaped connection face of the connection element; wherein more preferably the highly heat resistant steel pipe is an austenitic steel pipe.

A processing arrangement (for processing a process fluid) according to the invention comprises a furnace, preferably a steam cracking furnace, and a heat exchanger according to the invention, wherein the highly heat resistant steel pipe is or is connected to an outlet pipe of the furnace.

In the processing arrangement a chemical reaction in a process fluid can be caused by heating the process fluid to a corresponding temperature in the furnace. The furnace has typically coils and/or pipes through which the process fluid flows and in which the heating takes place. Upon undergoing the chemical reaction the process fluid exits the furnace through an outlet pipe which is typically of a highly heat resistant austenitic steel. From the outlet pipe the process fluid is guided through the linear quench exchanger to be cooled.

A material of the highly heat resistant steel pipe (of the pipe arrangement and the processing arrangement) is preferably an austenitic steel, particularly selected from X10NiCrAlTi32-20 (1.4876), X5NiCrAlTi31-20 (1.4958), X8NiCrAlTi32-21 (1.4959) or equivalent materials from other standard (e.g. Alloy 800 (UNS N08800), Alloy 800H (UNS N08810), Alloy 800HT (UNS N08811) or equivalent filler metal/welding consumables. Independently, a material of the first and or second ferritic steel pipes is preferably heat resistant steel, particularly selected from 13CrMo4-5, 16Mo3.

SHORT DESCRIPTION OF THE FIGS

The invention can be more fully understood by the subsequent description, in which reference is made to the accompanying drawings, wherein.

DETAILED DESCRIPTION OF THE FIGURES

Figure 1:
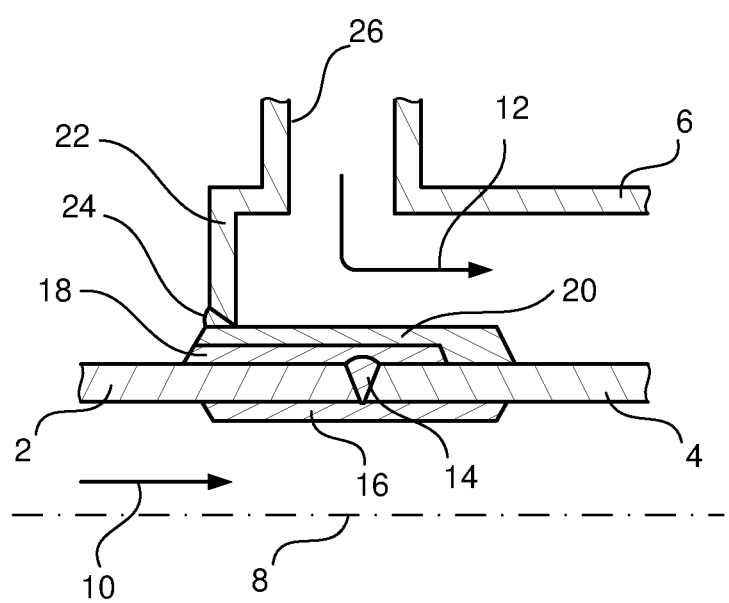
FIG. 1 is a cross-sectional view of an exemplary connection structure between a highly heat resistant pipe and a double pipe of a linear quench heat exchanger.

FIG. 1 shows a cross-sectional view of an exemplary connection structure between a highly heat resistant pipe 2, e.g. an outlet pipe of a steam cracking furnace, and a double pipe 4, 6 of a linear quench (heat) exchanger, which is of the double pipe heat exchanger type. The pipes are rotationally symmetric about an axis 8 of symmetry. Due to this rotational symmetry only a part of the cross-section is shown in the figure.

The highly heat resistant pipe 2 is typically made of an austenitic steel material and is, for example, an outlet pipe of a steam cracking furnace, or connected to such an outlet pipe. From the outlet pipe hot cracked gas 10 may flow through the highly resistant pipe 2. The double pipe of the linear quench heat exchanger consists of an inner pipe 4 and an outer pipe 6; the latter having a bigger diameter than the former, such that a cylinder barrel shaped space (cooling jacket) is formed between the two pipes 4, 6 through which a cooling fluid 12 can flow. The inner and outer pipes 4, 6 consist typically of a ferritic steel material.

The highly heat resistant pipe 2 is connected to the inner pipe 4 by a circumferential single-V weld joint 14. Preferably, a corrosion resistant steel material is chosen for the weld joint. The welding can for example be done by arc welding utilising a Nickel-based alloy, such as NiCr22Mo9Nb (EN material name).

On each side of the weld a plating 16, 18 is applied by a cladding process (also known as buttering) such as laser cladding, wherein preferably the same material is used as for the weld joint 14 between the highly heat resistant pipe 2 and the inner pipe 4. That is, an inner plating 16 and a first outer plating 18 are formed on the (radially) inside and outside surfaces, respectively, of the connected pipes 2, 4. Each plating covers the weld joint 14, i.e. extends along the circumference as well as in the length direction (i.e. in the direction of the axis of symmetry 8), wherein the extension in length direction is considerably longer (e.g. at least 5 times or at least 10 times) than the extension of the weld joint 14 in length direction. Thereby, each plating 16, 18 forms a protective cover for the weld joint 14 from the inside or from the outside. As for the weld 14, a corrosion resistant steel material is chosen for each plating, preferably.

Additionally, a second outer plating 20 is applied on the outside of the connected pipes 2, 4. The second outer plating is preferably made of a ferritic steel material. The second outer plating 20 at least partially covers (i.e. overlaps radially) the first outer plating 18, wherein the second outer plating 20 covers the edge (end) of the first outer plating 18 that is on the side of the inner pipe 4. That is, the second outer plating extends a longer distance in the direction of the inner pipe 4 (away from the weld 14) than the first outer plating. The edge of the first outer plating 18 that is on the side of the highly heat resistant pipe 2 may or may not be covered by the second outer plating 20.

Furthermore, an end plate 22 of the linear quench heat exchanger is welded to the second outer plating 20. The end plate 22 has essentially the shape of a circular disk with an opening in the middle through which the connected pipes extend. The edge of the circular disk at the opening is welded to the second outer plating 20, forming a weld 24. The end plate extends radially and forms together with a corresponding plate that is connected or in one-piece with the outer pipe 6 an inlet 26 for the cooling fluid. The end plate 22 and the weld 24 for its connection with the second outer plating are preferably of a ferritic steel material, e.g. of the same material as the inner and/or outer pipes 4, 6.

The structure of FIG. 1 is advantageous as the weld 14 is protected by the corrosion resistant inner plating and the corrosion resistant outer plating. The second outer plating and the end plate being welded to the second outer plating prevent direct contact of the cooling fluid (e.g. water) with the first outer plating (and the highly heat resistant pipe).

Figure 2:
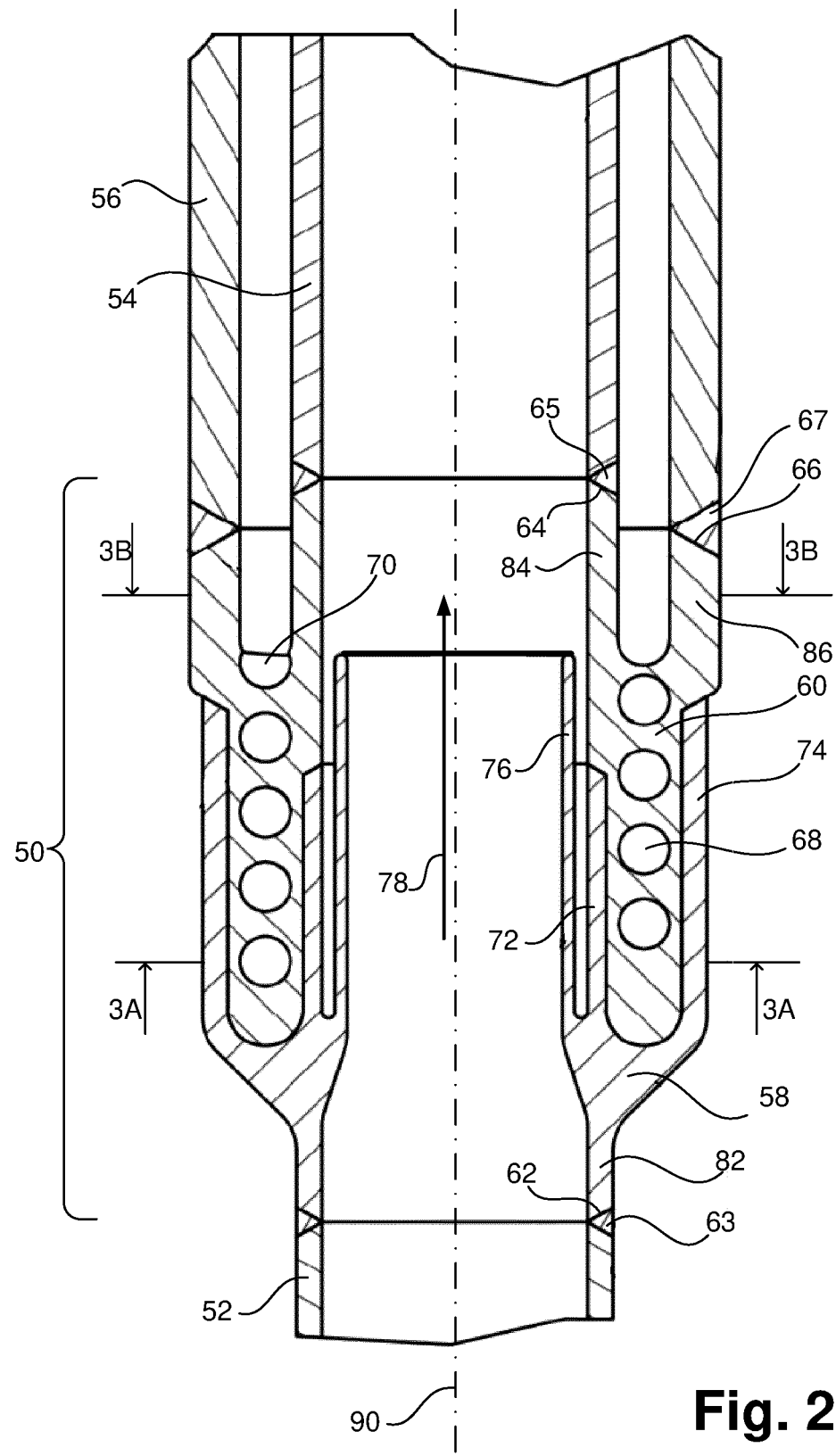
FIG. 2 is a cross-sectional view along the length axis of a connection element according to a preferred embodiment of the invention.

FIG. 2 depicts a cross-sectional view along the length axis of a connection element according to a preferred embodiment of the invention. In the figure a connection element 50 is interposed between a highly heat resistant steel pipe 52, particularly a austenitic steel pipe, (e.g. an outlet pipe of a steam cracking furnace) and a double pipe having two ferritic steel pipes 54, 56 (e.g. of a double pipe heat exchanger). The connection element 50 has a first part 58 and a second part 60, both having a tubular form. The length axis (and longitudinal direction) is defined as axis of symmetry of the tubular first and second parts, which coincides with the axes of the pipes. The length axis lies within the sectional plane. The elements shown are essentially (except for the cooling channel) rotationally symmetric about the length axis 90 (axis of symmetry).

The first part 58 has a first ring-shaped connection face 62 which is connected to the highly heat resistant steel pipe 52 by a circumferential weld 63. The first ring-shaped connection face 62 is an end face of a first sleeve 82, for example. The second part 60 has a second ring-shaped connection face 64 which is connected to the first (inner) ferritic steel pipe 54 by a circumferential weld 65. The second ring-shaped connection face 64 is an end face of a second sleeve 84, for example. The interiors of the first and second ring-shaped connection faces 62, 64 are connected through a passage formed by the connection element, such that a fluid entering the connection element through the first ring-shaped connection face is guided to the second ring-shaped connection face. That is, the connection element establishes a fluidic connection from the highly heat resistant steel pipe 52 to the first ferritic pipe 54.

The second part 60 further preferably has a third ring-shaped connection face 66 which is connected to the second (outer) ferritic steel pipe 56 by a circumferential weld 67. The third ring-shaped connection face 66 is an end face of a third sleeve 86, for example. Seen in longitudinal direction, i.e. the direction of the axis of symmetry (length axis), the third ring-shaped connection face is concentrically arranged with the second ring-shaped connection face. Its position along the length axis may however, as shown, be different from the position of the second ring-shaped connection face. In case no second ferritic steel pipe is present, e.g. in the case of another type of heat exchanger, a connection element without a third ring-shaped connection face may be used.

The first part 58 is of a corrosion resistant steel material. The second part 60 is of a ferritic steel material. The first and second parts are produced by an additive manufacturing process, e.g. by direct energy deposition or wire arc additive manufacturing. As a result the first and second parts are formed as one piece, i.e. the two parts are not separable from each other (without destruction). While there is a line separating the two parts is drawn in the figure, there is substantially only change of the steel material, due to the additive manufacturing.

Further, preferably a circumferential cooling channel 68 is included in the connection element 50. The cooling channel 68 has the form of a spiral, for example. Preferably, as depicted the cooling channel 68 is arranged in the second part 60. However, it is also possible to arrange a cooling channel at least partially in the first part. An outlet 70 of the cooling channel is arranged between the second and third connection faces (sleeves) 64, 66 of the second part 60. Thus, cooling fluid may be introduced into the space between the first and second (inner and outer) ferritic steel pipes from the cooling channel 68 of the connection element. That is, the cooling channel can be seen as an inlet for cooling fluid into the cooling jacket of a double pipe heat exchanger formed by the inner and outer ferritic pipes 54, 56.

As shown the first part 58 has preferably an inner sleeve 72 and/or and outer sleeve 74 between which a section of the second part 60 extends in length direction or which extends parallel to a section of the second part 60 in length direction. In other words, the inner and/or outer sleeves 72, 74 are, at least partially, arranged in radially overlapping relation with a section of the second part 60, wherein the inner/outer sleeve is arranged on the inner/outer side of the section of the second part (without any radial distance, e.g. produced as one-piece in the additive manufacturing process). In particular, the cooling channel, if present, is preferably positioned at least partially between the inner and outer sleeves. An inlet (not shown in FIG. 2; cf. FIGS. 3A, 3B) of the cooling channel may then extend through the outer sleeve.

Further, the first part 58 may comprise a thermo-sleeve 76 that extends inside (i.e. in the passage between the first and second ring-shaped connection faces) the connection element radially spaced from the second part and/or, if present, the inner sleeve in longitudinal direction towards the second ring-shaped connection face. That is, the thermo-sleeve is arranged, such that a fluid entering the connection element from the first ring-shaped connection face, i.e. from the highly heat resistant steel pipe 52, flows through the thermo-sleeve towards the second ring-shaped connection face, as indicated by arrow 78.

Figure 3A:
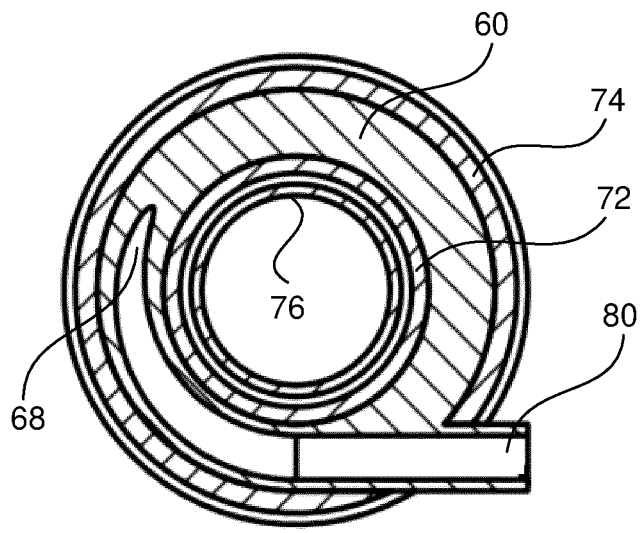
FIGS. 3A and 3B are cross-sectional views orthogonal to the length axis of a connection element according to a preferred embodiment of the invention.
Figure 3B:
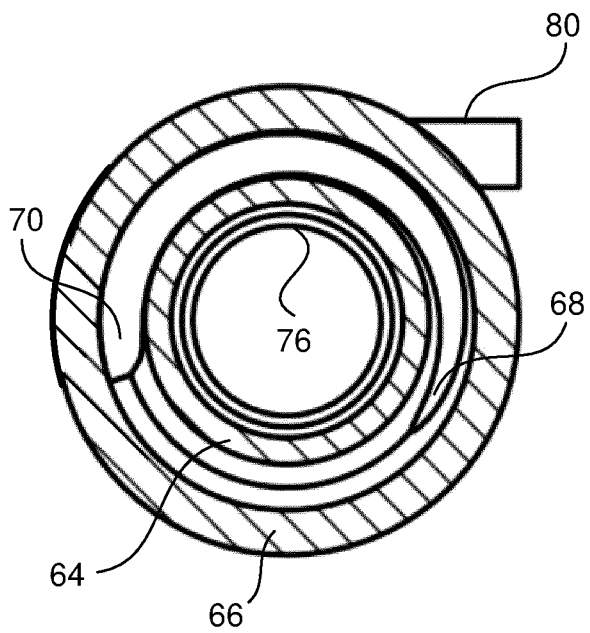

FIGS. 3A and 3B are cross-sectional views orthogonal to the length axis 90 of the connection element according to the preferred embodiment illustrated in FIG. 2. FIG. 3A is a cross-section at the (longitudinal) position of an inlet 80 for the cooling channel 68; the position and the direction of the view are indicated in FIG. 2. Further, in the figure cross-sections are visible of the inner and outer sleeves 72, 74 and of the thermo-sleeve 76. FIG. 3B is a cross-sectional view in the opposite direction to FIG. 3A and at a different position, as indicated in FIG. 2. In this figure the outlet 70 of the cooling channel 68 is visible as well as the second and third (inner and outer) ring-shaped connection faces 64, 66 of the second part. Further, the thermo-sleeve 76 can be seen.

While the invention has been described in terms of embodiments and examples in the preceding specification, the scope of the present invention is restricted by the appended claims, not by specific embodiments of the specification. It should be noted that elements of the different embodiments may be combined even if not explicitly stated.

The invention claimed is:

1. A connection element comprising:
a tubular first part with a first ring-shaped connection face for connection with an austenitic steel pipe and a tubular second part with a second ring-shaped connection face for connection with a first ferritic steel pipe;
wherein the tubular first part is of an austenitic steel material and wherein the tubular second part is of a ferritic steel material;
wherein the tubular first and second parts are in one-piece and formed such that a passage between the first and second ring-shaped connection faces is formed; and
wherein the tubular first and second parts are produced by an additive manufacturing process,
wherein the tubular second part has a third ring-shaped connection face for connection with a second ferritic steel pipe,
wherein the third ring-shaped connection face is arranged concentrically with the second ring-shaped connection face, as seen in a length direction,
wherein a cooling channel extending along a circumference is formed in the tubular first part.

2. The connection element according to claim 1, wherein the additive manufacturing process is a cladding process, direct energy deposition, wire arc additive manufacturing, electron beam additive manufacturing, laser beam additive manufacturing, or plasma arc additive manufacturing.

3. The connection element according to claim 1, wherein an outlet of the cooling channel is arranged between the second ring-shaped connection face and the third ring-shaped connection face.

4. The connection element according to claim 3, wherein the cooling channel is spiral-shaped.

5. The connection element according to claim 1, wherein the tubular first part comprises an inner sleeve and/or an outer sleeve arranged in radially overlapping relation on an inside or an outside of a section of the tubular second part.

6. The connection element according to claim 1, wherein the tubular first part comprises a thermo-sleeve that extends inside the tubular first part;
wherein the thermo-sleeve is spaced apart from the tubular second part and/or the inner sleeve.

7. The connection element according to claim 1, having a transition region between the tubular first and second parts, in which a gradual transition between the compositions of the materials of the tubular first and second parts takes place.

8. The connection element according to claim 1, wherein the material of the tubular first part is an austenitic steel, selected from NiCr23Co12Mo, NiCr22Mo9Nb; and/or wherein the material of the tubular second part is selected from 16Mo3, 13CrMo4-5, 10CrMo9-10.

9. A pipe arrangement comprising a highly heat resistant steel pipe, an inner ferritic steel pipe and a connection element according to claim 1, wherein an end of the highly heat resistant steel pipe is connected to the first ring-shaped connection face of the connection element by a circumferential weld joint, and wherein an end of the inner ferritic steel pipe is connected to the second ring-shaped connection face of the connection element by a circumferential weld joint.

10. The pipe arrangement according to claim 9, further comprising an outer ferritic steel pipe that forms a double pipe together with the inner ferritic steel pipe; and wherein an end of the inner ferritic steel pipe is connected to the third ring-shaped connection face of the connection element by a circumferential weld joint.

11. A heat exchanger comprising an inner ferritic pipe for a fluid to be cooled and a connection element according to claim 1; wherein an end of the ferritic inner pipe is connected to the second ring- shaped connection face of the connection element.

12. The heat exchanger according to claim 11, wherein the heat exchanger is a double pipe heat exchanger having a double pipe formed by the inner ferritic pipe and an outer ferritic pipe; and wherein an end of the outer ferritic pipe is connected to the third ring-shaped connection face of the connection element.

13. The heat exchanger according to claim 11, further comprising a highly heat resistant steel pipe; wherein an end of the highly heat resistant steel pipe is connected to the first ring-shaped connection face of the connection element.

14. A processing arrangement comprising a furnace and a heat exchanger according to claim 13, wherein the highly heat resistant steel pipe is or is connected to an outlet pipe of the furnace.

15. The connection element according to claim 1, wherein the tubular first part comprises an inner sleeve and/or an outer sleeve arranged in radially overlapping relation on an inside or an outside of a section of the tubular second part, and wherein the inner and/or outer sleeves are arranged at least partially in radially overlapping relation with the cooling channel.

16. The connection element according to claim 1, wherein the tubular first part comprises a thermo-sleeve that extends inside the tubular first part, wherein the thermo-sleeve is spaced apart from the tubular second part and/or the inner sleeve, and wherein the thermo-sleeve radially overlaps the cooling channel.

17. The pipe arrangement according to claim 9, wherein the highly heat resistant steel pipe is an austenitic steel pipe.

18. The heat exchanger according to claim 11, wherein the end of the ferritic inner pipe is connected to the second ring-shaped connection face of the connection element by a circumferential weld joint.

19. The heat exchanger according to claim 12, wherein the end of the outer ferritic pipe is connected to the third ring-shaped connection face-of the connection element by a circumferential weld joint.

20. The heat exchanger according to claim 13, wherein the end of the highly heat resistant steel pipe is connected to the first ring-shaped connection face of the connection element by a circumferential weld joint, and the highly heat resistant steel pipe is an austenitic steel pipe.

\* \* \* \* \*